United States Patent
Best et al.

[11] Patent Number: 5,828,147
[45] Date of Patent: Oct. 27, 1998

[54] STATOR FOR AN ELECTRIC MOTOR

[75] Inventors: Dieter Best, Ingelfingen; Wilhelm Reinhardt, Schrozberg-Gütbach; Rudolf Rebentrost, Niedernhall; Gunter Streng, Schrozberg; Berthold Walke, Utzmemmingen, all of Germany

[73] Assignee: EBM Werke GmbH & Co., Germany

[21] Appl. No.: 794,688

[22] Filed: Feb. 3, 1997

Related U.S. Application Data

[63] Continuation of Ser. No. 753,872, Nov. 29, 1996.

[30] Foreign Application Priority Data

Dec. 1, 1995 [DE] Germany ............... 195 44 830.8

[51] Int. Cl.$^6$ .................... H01R 33/20; H02K 11/00
[52] U.S. Cl. .................... 310/71; 336/192; 439/675
[58] Field of Search .................... 310/71; 336/192; 439/675

[56] References Cited

U.S. PATENT DOCUMENTS

| | | | |
|---|---|---|---|
| 3,979,615 | 9/1976 | Neff | 310/71 |
| 3,984,714 | 10/1976 | Grözinger | 310/194 |
| 4,593,464 | 6/1986 | Williams et al. | 29/879 |
| 4,689,023 | 8/1987 | Strong, III et al. | 310/71 X |
| 5,196,752 | 3/1993 | Palma | 310/260 |
| 5,229,674 | 7/1993 | Best | 310/71 |
| 5,357,160 | 10/1994 | Kanada et al. | 310/67 R |
| 5,519,273 | 5/1996 | Keck | 310/71 |

FOREIGN PATENT DOCUMENTS

| | | |
|---|---|---|
| 064 105 | 11/1982 | European Pat. Off. . |
| 24 41 175 | 3/1976 | Germany . |
| 125 636 | 3/1984 | United Kingdom . |

*Primary Examiner*—Clayton E. Laballe
*Assistant Examiner*—Judson H. Jones
*Attorney, Agent, or Firm*—Jones & Askew

[57] ABSTRACT

The present invention pertains to a stator for an electric motor, composed of a stator core assembly (2), stator windings (3) and, arranged at one end of the stator core assembly (2), an interconnecting arrangement (4) for the stator windings (3). An interconnecting arrangement (4) features an insulating part (9) with slotted chambers (11) in order to accept electrical connecting leads (12), insulated from each other, in order to interconnect the wire ends (7) of the stator windings (3).

20 Claims, 8 Drawing Sheets

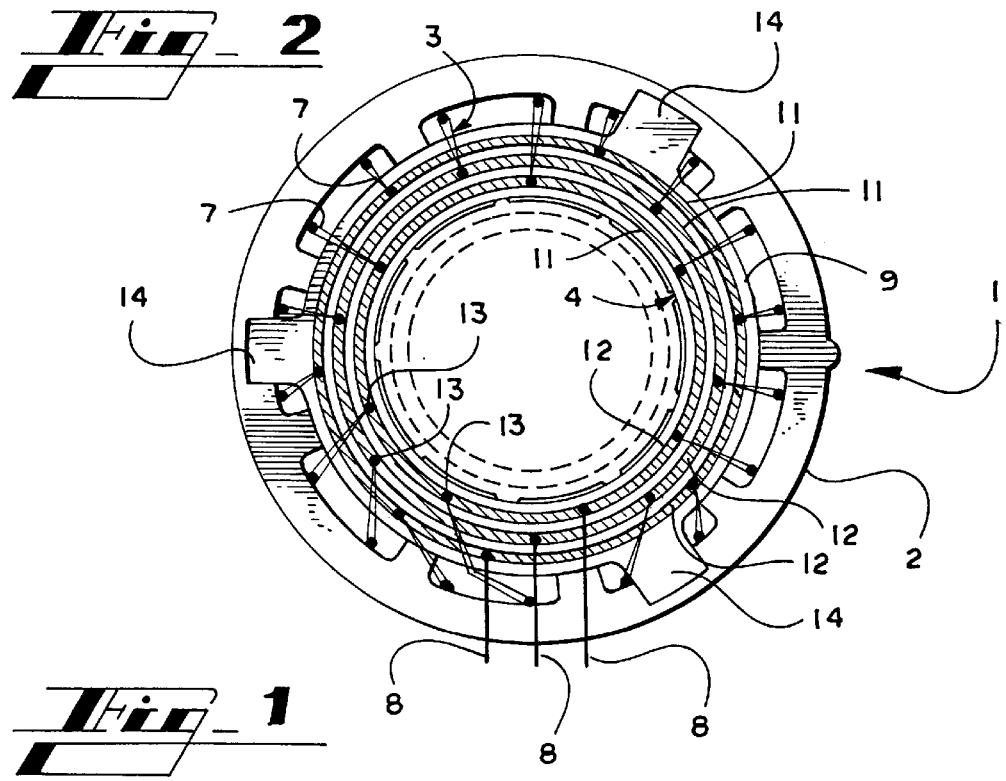
Fig_2
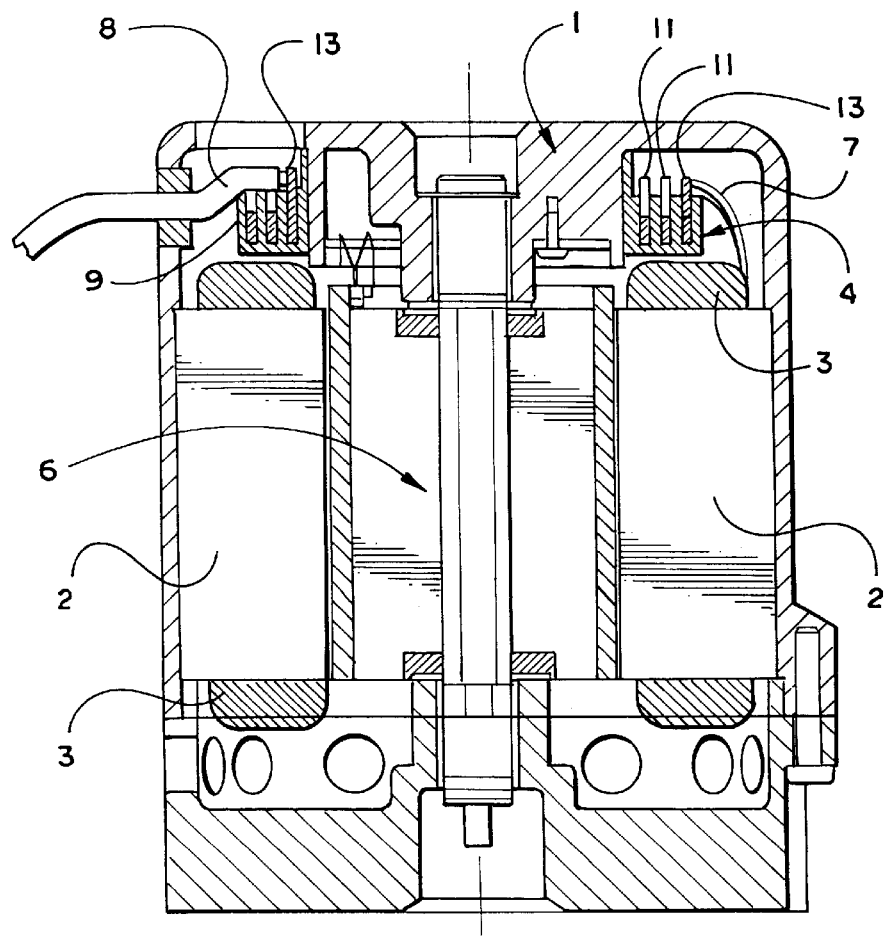
Fig_1

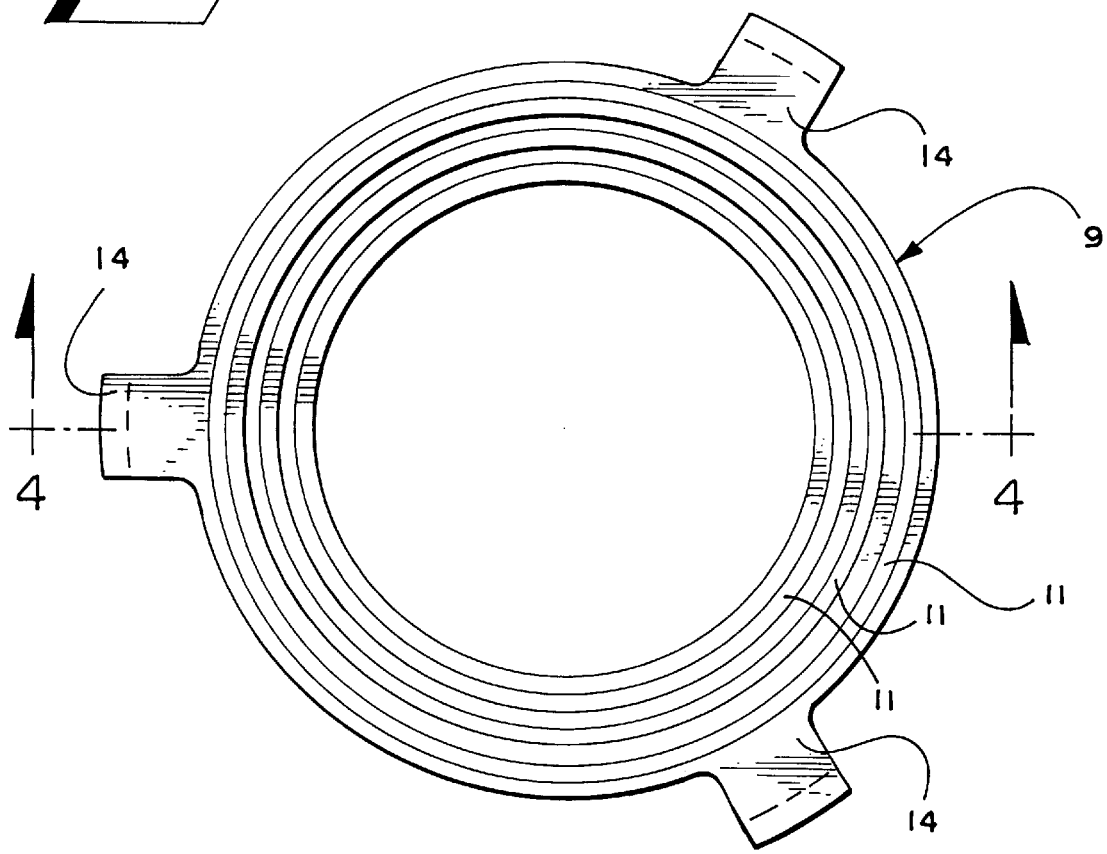
Fig_3
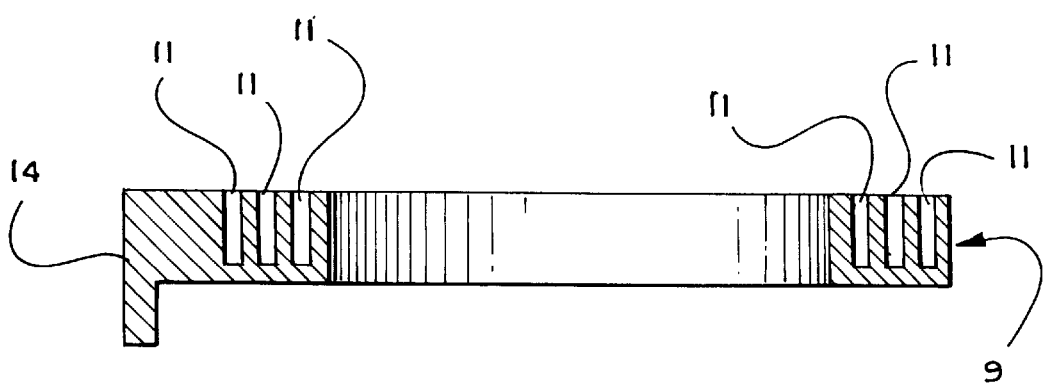
Fig_4

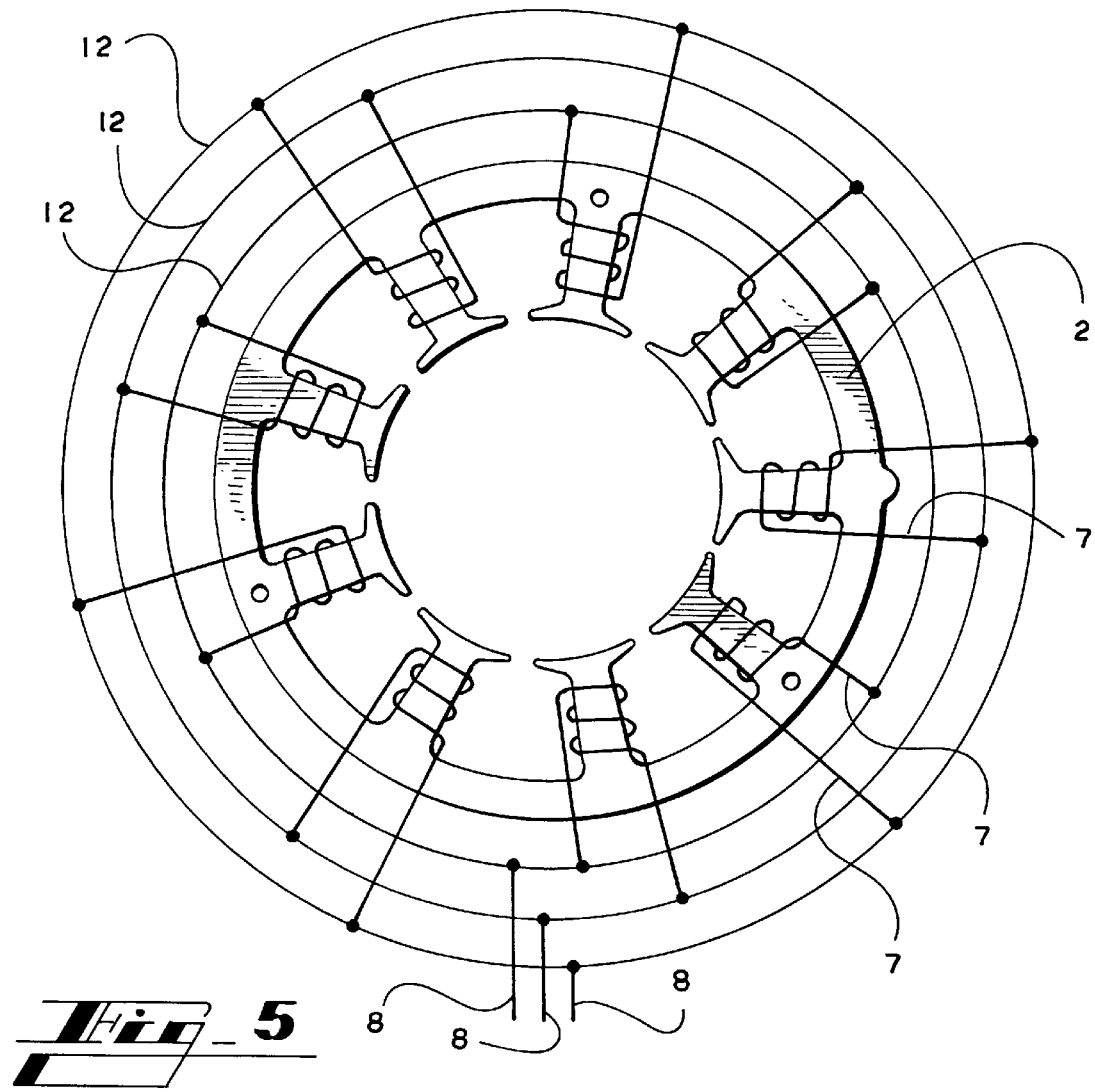
Fig_5
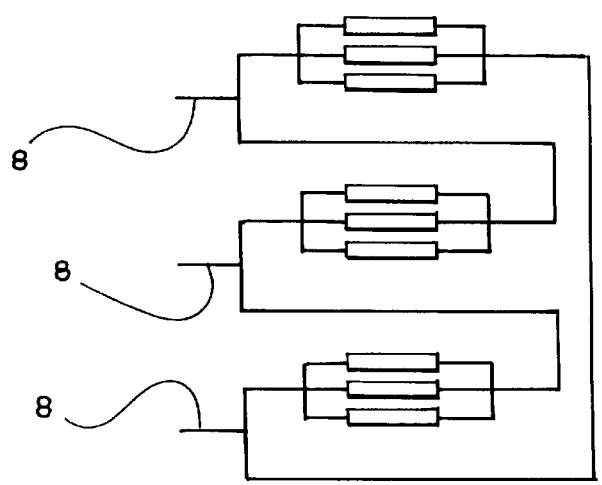
Fig_6

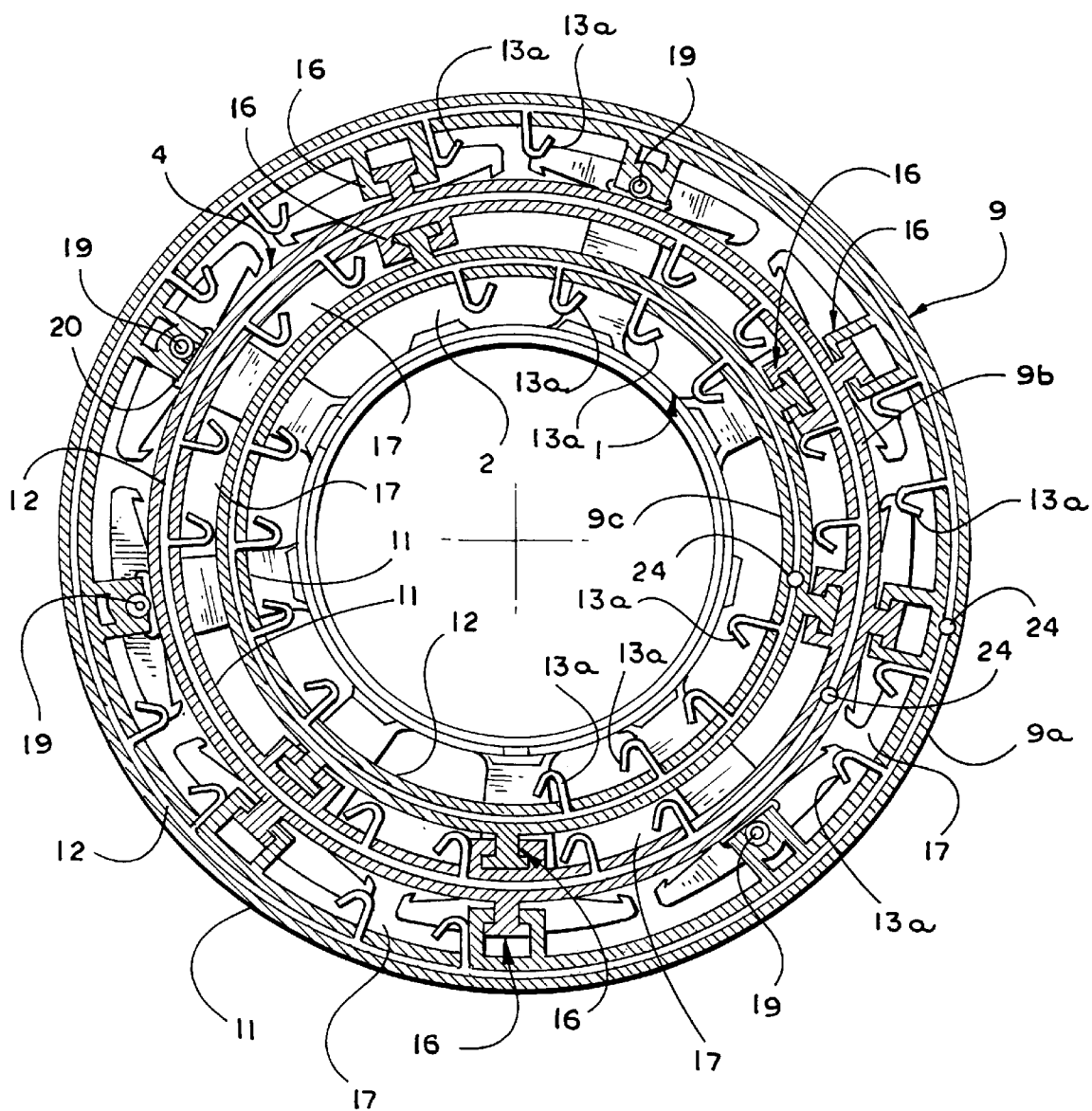
Fig_7

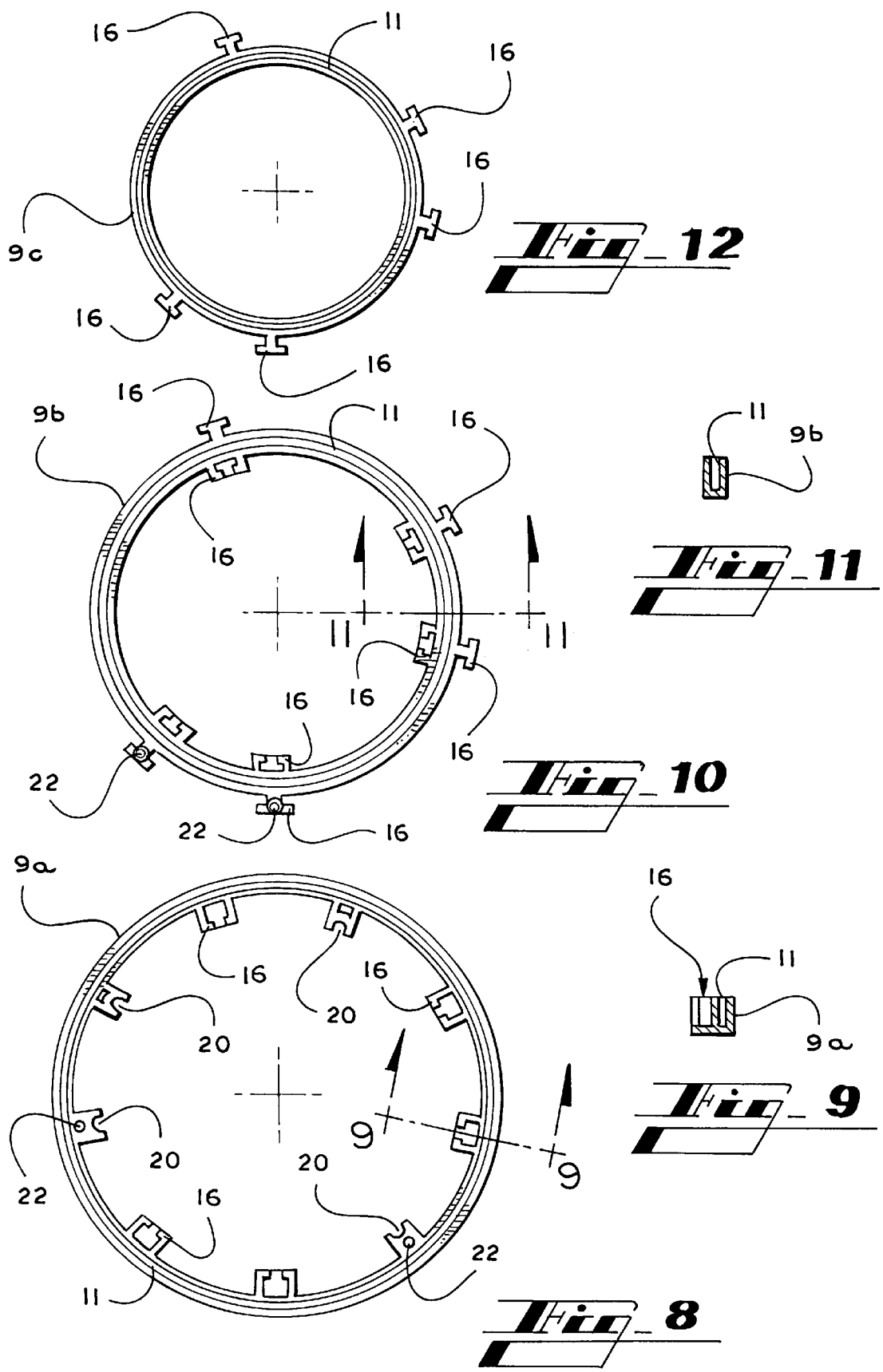

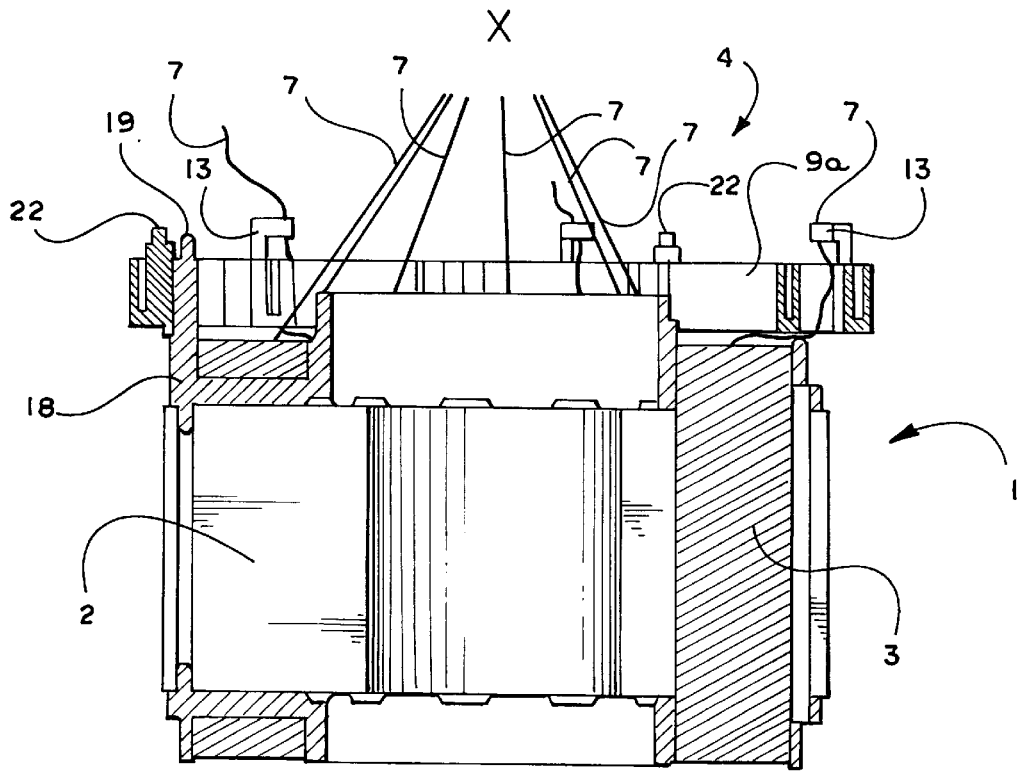
Fig_13B
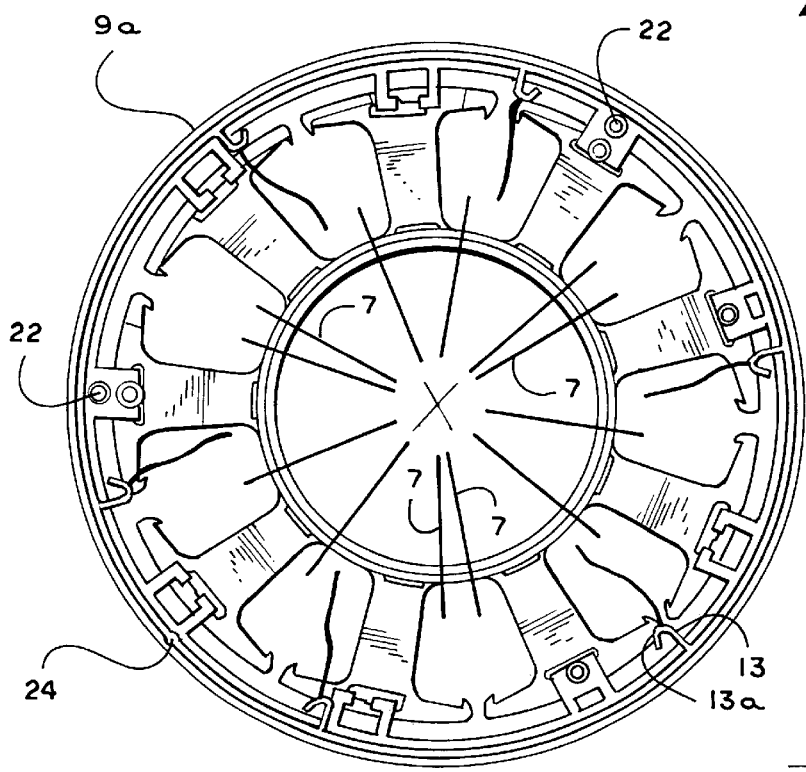
Fig_13A

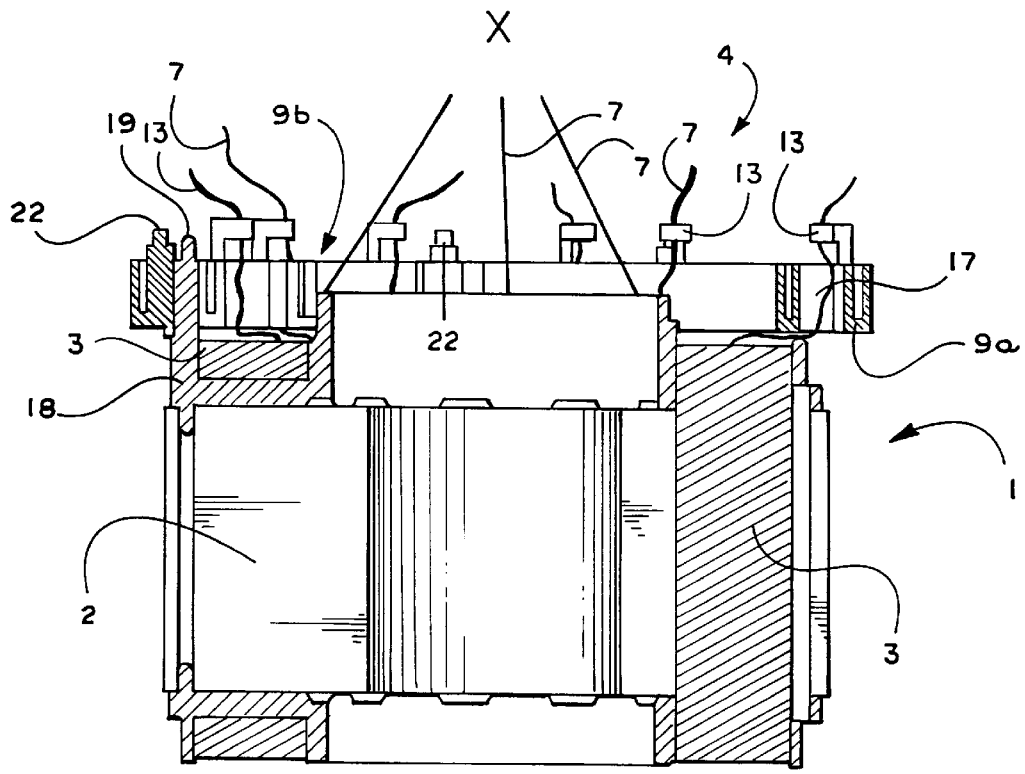
*Fig_14B*
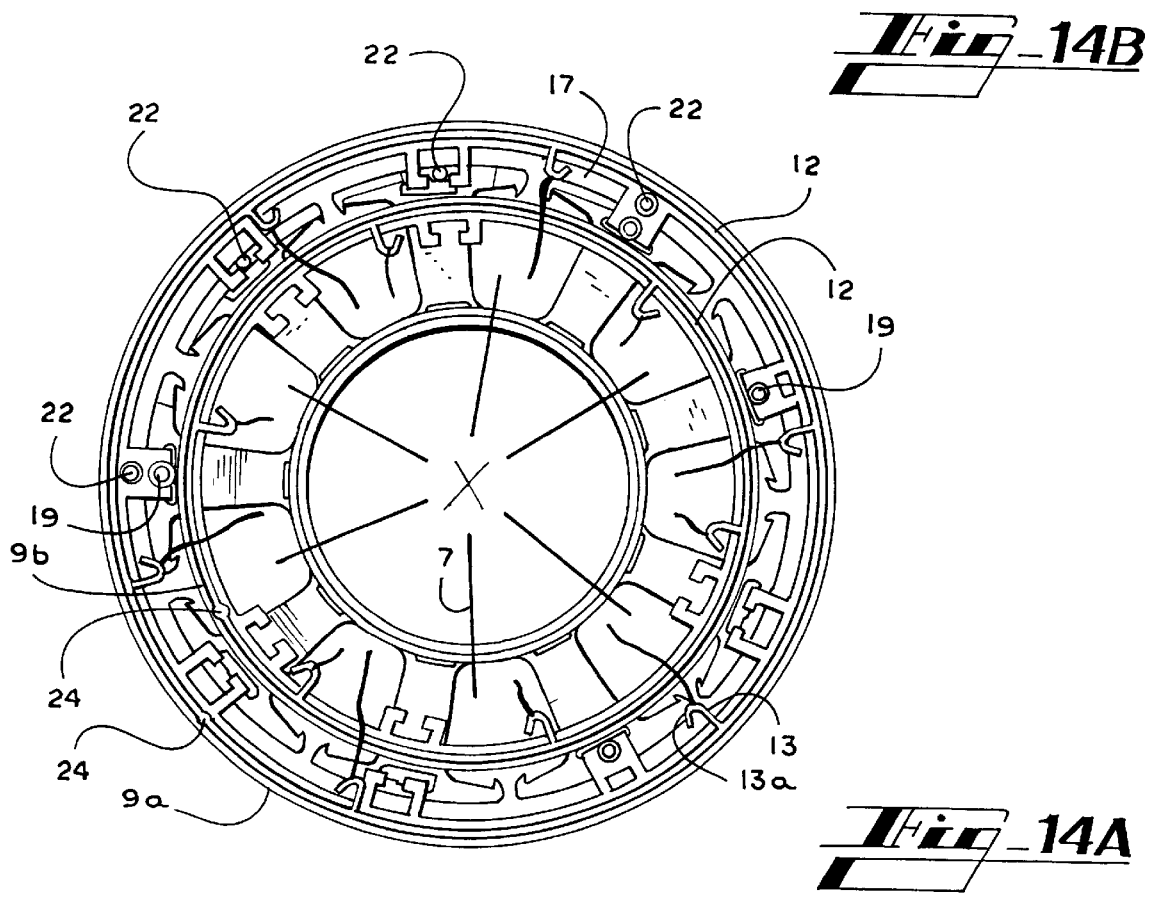
*Fig_14A*

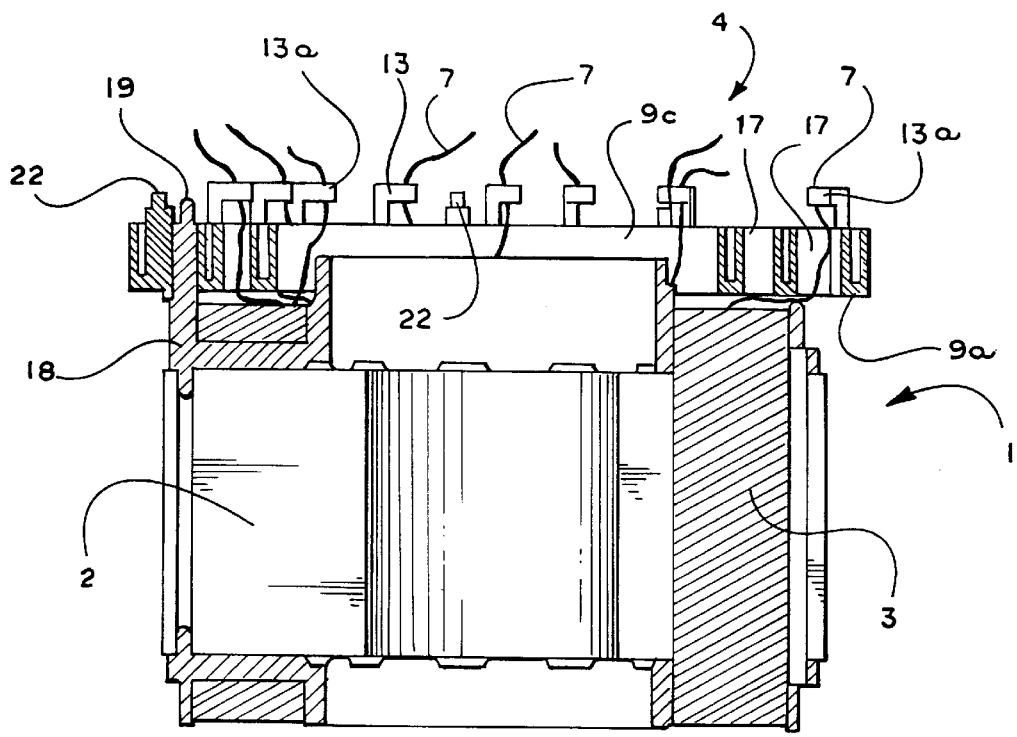
Fig_15B
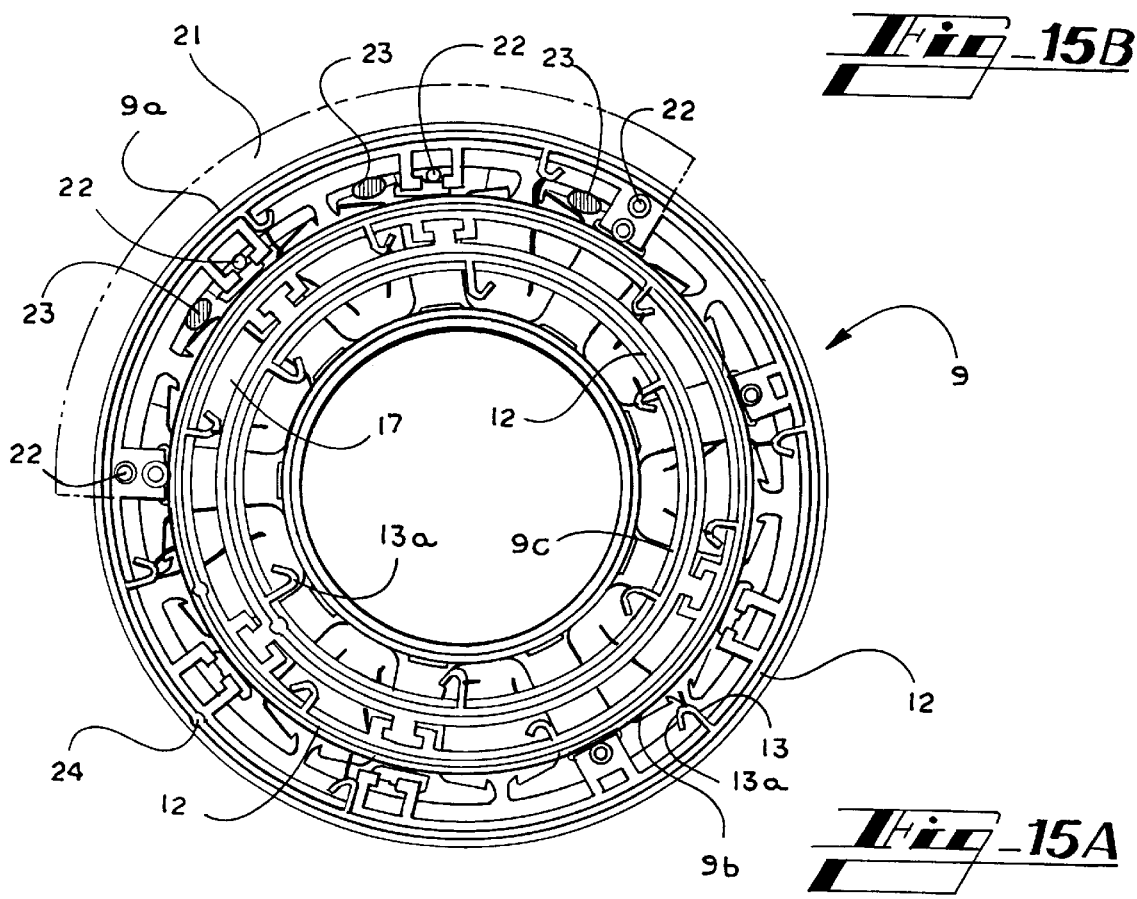
Fig_15A

STATOR FOR AN ELECTRIC MOTOR

CROSS-REFERENCE TO RELATED APPLICATION

This application is a continuation of application Ser. No. 08/753,872 filed Nov. 29, 1996.

The present invention pertains to a stator for an electric motor, composed of a stator core assembly, stator windings, and, arranged at one end of the stator core assembly, an interconnecting arrangement for the stator windings.

Stators of this generic class are already known, wherein the interconnecting arrangement for interconnecting of the wire ends of the winding(s of the stator as well as for connecting the terminal leads of the motor is guaranteed by means of a printed-circuit board (card) arranged at the end of the stator core assembly or by means of an interconnecting element similar to a printed-circuit board. The wire ends of the windings are interconnected—in accordance with the operating mode of the motor—by means of printed conductors arranged on the card or on the interconnecting element.

However, this type of stator has the disadvantage that only limited motor current can be carried due to the limited conductor cross section of the printed conductors arranged on the card. Therefore, this type of stator is suitable only for motors of limited current.

The basic purpose of the present invention is to create a stator of the same generic class that is suitable, in particular, for a motor of low voltage (U (24 V) and relatively high current (S (20 A) which is simple and economical to produce. In addition, the stator to be created should also guarantee a certain variability for the method of interconnecting the stator windings. Moreover, it is preferable that it be possible to perform this interconnecting in a completely automatic manner.

In accordance with the invention, this is carried out by an interconnecting arrangement that features an insulating part with slotted chambers that accept electrical connecting leads, insulated from each other, in order to interconnect the wire ends of the windings of the stator windings. Configuring an interconnecting arrangement in accordance with the invention makes it possible, to advantage, to interconnect the wire ends of windings of a motor of higher current without problems, without the fear of overheating or destroying the interconnecting arrangement, since connecting leads with greater cross sections can be realized. In addition, the object of the invention allows a high level of variability in the interconnecting of wire ends of the windings, since either continuous ring conductors or, on the other hand, individual ring sections, insulated with respect to each other, can be inserted in chambers, preferably ring slots, as electrical connecting leads for the wire ends of the windings of the stator. A more advantageous, fully automatic interconnecting is possible since the coordinates of the fastening points can be established and assigned unequivocally to the wire ends of the individual coils.

The subordinate claims and the following description of the figures contain additional advantageous features of the invention.

In the following, the invention is explained in greater in an example, with the aid of the drawing. Shown are:

FIG. 1: An axial section of an electric motor with a stator in accordance with the invention that has a first embodiment of an interconnecting arrangement in accordance with the invention, with a single-piece insulating part, FIG. 2: The stator in accordance with the invention, in accordance with FIG. 1, in an axial top view of the side of the interconnecting arrangement, FIG. 3: An enlarged top view of an insulating part of the embodiment in accordance with FIGS. 1 and 2, FIG. 4: A section along line IV—IV in accordance with FIG. 3, FIG. 5: A schematic representation of a stator having stator windings and, by way of example, in one possible interconnection of the stator windings in a delta connection, FIG. 6: An equivalent circuit diagram for an interconnection in accordance with FIG. 5, FIG. 7: An axial top view of an interconnecting arrangement similar to FIG. 2, but in a preferred embodiment having a multipart insulating part, FIGS. 8,10,12: In top views, the respective individual parts of an insulating part in accordance with FIG. 7, FIG. 9: An enlarged cross section of a first individual part in plane IX—IX in accordance with FIG. 8, FIG. 11: An enlarged cross section of a second individual part in plane XI—XI, in accordance with FIG. 10, FIGS. 13*a*, 13*b*, 14*a*, 14*b*, 15*a* and 15*b*: In each case, in top view (representation a) and as a partial axial section (representation b), a stator in different phases of production during assembly of an interconnecting arrangement in accordance with FIG. 7.

Equal or functionally corresponding parts are always provided with the same reference numbers in the following description of the figures and in the different figures.

FIG. 1 shows a motor with an internal rotor as an embodiment example of all electric motor. An electric motor is composed essentially of a stator (1) in accordance with the invention having stator core assembly (2), stator windings (3) and an interconnecting arrangement (4), as well as a conventional rotor (6). An interconnecting arrangement (4), in accordance with the invention, serves to interconnect the wire ends (7) of the stator windings (3) as well as to connect motor terminal leads (8).

In the embodiment in accordance with FIGS. 14–4, an interconnecting arrangement (4) features a preferably single-piece insulating part (9) with slotted chambers (11) that accept electric connecting leads (12), insulated with respect to each other, which serve to connect the wire ends (7) of the windings and the motor terminal leads (8). The insulating part (9) is preferably of circular design and is, in particular, coaxial with respect to the motor axis. Chambers (11) are preferably in the form of ring slots that are coaxial in insulating part (9) (FIGS. 3 and 4).

FIGS. 3 and 4 represent an insulating part (9) in a preferred embodiment as a hollow cylinder section, wherein chambers (11) of different diameters are in a concentric arrangement and are open at the edge facing away from the stator core assembly (2) in an axial direction. Chambers (11) are preferably in the form of ring slots that have rectangular cross sections and that accept (annular connecting leads (12), preferably in the form of bars, which are adapted to the cross section of the ring slots. Different locations of the connecting leads (12) feature terminal extensions (13), in particular of a tab type, which preferably project from the chambers (11) in the axial direction in order to connect the wire ends (7) of the windings and the motor terminal leads (8). In order to connect the wire ends (7) of the windings, they are guided preferably from the outside in a curve past or over the insulating part (9) and connected in an electrically conductive way to the terminal extensions (13) facing away from the stator core assembly (2), in particular, by soldering or welding (FIG. 1).

Connecting leads (12), composed preferably of copper or brass and featuring, in particular, a rectangular cross section, are produced preferably by being stamped or cut from sheet material. Connecting leads (12) can be in the form either of continuous rings or strips, where strips, which are preferably initially straight, are adapted to the shape of the chambers (11) in a subsequent operation (bending step).

In addition, an insulating part (9) is provided with at least one mounting extension (14), in the embodiment represented, preferably three mounting extensions (14) are provided for a friction- and/or form-fit connection to the stator core assembly (2).

Mounting extensions (14) are arranged preferably around the perimeter of an insulating part (9) in a uniform distribution and, in particular, are formed in such a way that an insulating part (9) can be fastened to a stator core assembly by means of a lock-in connection. For this purpose, mounting extension(s) (14), are preferably formed at an angle so that they radially project from the part of the insulating part (9) featuring chambers (11) and so that they also have a section that runs parallel to the motor axis and the direction of the end surfaces of the stator core assembly (2), for a form- and/or friction-fit connection with the latter. Naturally, a fastening by means of a screw connection or the like also is conceivable.

In a variation from the representation in FIG. 2, connecting leads (12) arranged in chambers (11), preferably of an annular form, can be interrupted, preferably at least one location, in order to simplify fabrication. This has the advantage that connecting leads (12) can be produced initially in a straight form, e.g., Cut into sections from "continuous material," and subsequently bent into circular form. Also, it goes without saying that it is possible to design connecting leads (12), not as electrically continuous ring conductors but as individual partial sections (ring sectors) that are electrically insulated with respect to each other.

As an example, FIGS. 5 and 6 show schematically one possible way to interconnect stator windings (3). Here, different stator windings (3) are interconnected with each other, e.g., in the form of a delta connection. FIG. 5 shows a stator core assembly (2), with individual stator windings (3) interconnected in a delta connection by means of connecting leads (12). For all interconnection of this type, an insulating part (9) features preferably three chambers (11) in order to accept three connecting leads (12). FIG. 6 shows the corresponding electrical equivalent circuit diagram.

In one embodiment, not represented, which comprises a star connection of stator windings, an insulating part (9) is provided with four chambers in order to produce a neutral point.

In the following, a preferred embodiment of an interconnecting arrangement (4) in accordance with the invention is explained with the aid of FIGS. 7–15. Here, an insulating part (9) is composed of several individual parts (9a,9b,9c). It is effective for each connecting lead (12) to be provided with an individual part, which, in particular, is correspondingly annular and which features respective chambers (11) for the connecting lead (12). Therefore, for the preferred embodiment having three annular connecting leads (12), three annular individual parts (9a,b,c) are also provided.

As follows from FIG. 7 and also from FIGS. 13–15, individual annular parts (9a–c), concentric with different diameters, of an insulating part (9) are connected to each other by means of connecting elements (16) in such a away that leadthroughs (17) for the wire ends (7) of the windings are formed between respective adjacent individual parts (on the one hand, 9a and 9b and, on the other hand, 9b and 9c), on the basis of the radial clearance. Connecting elements (16) preferably are in the form of connecting profiles which can be slid one into the other in an axial direction. The embodiment that is represented shows a T-profile, although a dovetailed profile or the like also can be provided. Connecting elements (16) can be arranged in a uniform or—as represented—in a nonuniform distribution about the periphery.

Due to the multipart nature of an insulating part (9) in connection with leadthroughs (17) formed between individual parts (9a,b,c), the wire ends of the windings, in contrast to the embodiment in accordance with FIGS. 1–6, advantageously can be guided from stator windings (3) to terminal extensions (13), without having to "cross" the connecting leads (12) in this connection. This means that the wire ends (7) of the windings can run advantageously "underneath" individual insulating parts, i.e., between the end winding of a stator and individual insulating parts (9a,b,c). This results in an especially safe and secure insulation between individual connecting leads (12) and the wire ends (7) of the windings and, in fact, without the maintenance of large safety clearances that would lead to an unnecessary extension of the overall axial length of a motor.

The terminal extensions (13) of the connecting leads (12) preferably feature end hooks (13a) that, after insertion of the wire ends (7) of the windings, are pressed and, in particular, pressure welded in order to create an electrically conductive connection. It is preferable for the respective hooks (13a) to be located, in accordance with FIGS. 7 and 13a–15a, in an axial direction, "over" the regions of leadthroughs (17) formed between the individual parts (9a,b,c) of insulating part (9) or "over" the cross sectional region enclosed by the innermost individual part (9c). Thus, the respective wire ends (7) of the windings can be guided past the individual parts of the insulating part (9) in an axial direction, to the hooks (13a) (see, in particular, FIGS. 13–15).

It is preferable to fasten an insulating part (9) to a stator (1), i.e., to all insulating part (18) by means of a pin connection. In the embodiment represented, an insulating part (18) has several axial pins (19) for this purpose that engage with openings (20) of insulating part (9). The pins (19) are best recognized in FIGS. 13b, 14b and 15b. The openings (20) can be recognized in FIG. 8; they are formed, respectively, between a first insulating part (9a) and a second insulating part (9b).

A printed-circuit board (21) can be fastened to an insulating part (9)—as indicated ill FIG. 15a—on the side facing away from the stator windings (3) in an axial direction. This fastening can also be carried out preferably by means of a pin connection which., in the example represented, is composed of several axial pins (22) of all insulating part (9) that engage with corresponding openings of a printed(d-circuit board (21). The printed-circuit board (21) carries certain components of a motor control circuit, in particular, rotational position sensors (23) for the rotor, which conventionally are in the form of Hall sensors. As is evident in FIG. 15a, rotational position sensors (23) project between and through the individual insulating parts (9a,9b) in an axial direction into the region of a rotor.

This embodiment, in accordance with FIGS. 7–15, results in a very simple and economical fabrication with a good and secure electric insulation and limited overall length. From FIGS. 13–15, assembly of the motor is carried out as follows:

In accordance with Figures (13a,b), a first, outer individual insulating part (9a) equipped with connecting leads (12) is pushed onto pins (19) of a wound stator (1). During this assembly, all wire ends (7) of the windings are collected at a point, designated X, which is located approximately in the center of the axial extension, and are fixed to a positioning device, which is not represented. This fixing in place of the wire ends of the windings makes it possible to simply push on individual insulating parts. After a first individual part (9a) is fastened, the wire ends (7) of the windings provided for the connecting leads (12) of the former are removed from the positioning device for the winding wire and guided outward in a radial direction and, initially, mechanically fastened to corresponding terminal extensions (13) or hooks (13a). In accordance with FIGS. 14a,b, a second insulating retaining part (9b) is then fastened in an axial direction, with connecting elements (16) being slid one into the other. Then the corresponding wire ends (7) of the windings are guided to the second connecting leads (12) and fastened mechanically.

Finally, in accordance with FIGS. 15a,b, assembly is carried out for a third individual insulating part (9c) by means of connecting elements (16), along with the connection of the wire ends (7) of the windings. In accordance with the invention, this results in terminal connections that are free of crossovers, since the wires of the windings are guided, not over the connecting leads (12), but under individual insulating parts. As a result, there is no problem in maintaining special safety clearances; a secure insulation can also be achieved with a shorter overall length.

Finally, the wire ends (7) of the windings are welded to the hooks (13a) with a pressure welding arrangement.

The connecting leads (12) are equipped with a number of hooks (13a) corresponding to the number of coil windings of the stator. In addition, fastening points (24) (see FIGS. 7 and 13a–15a) are provided in order to connect motor terminal leads which are guided outward.

The invention is not limited to the embodiments represented and described; it includes all embodiments functioning in a like manner in the sense of the invention. Therefore, the number of chambers (11) or connecting leads (12) is a function, naturally, of the desired method of connection or motor type. Moreover, the circular configuration of an insulating part (9) represents only one advantageous configuration. Embodiments of an insulating part (9) that deviate from a circular shape, naturally, are likewise conceivable. Also, it is conceivable to design the connecting leads (12) is conductors with a circular cross section, which then can be inserted in correspondingly adapted chambers (11). In addition, it is conceivable to design an insulating part (9) with chambers (11) which are arranged side by side or in succession in an axial direction. For an execution of this type, the chambers (11) would be designed to have the open edge facing radially outward, and the terminal extensions (13) of the connecting leads (12) preferably would [also] be designed to face radially outward.

We claim:

1. A stator for an electric motor, comprising:
   a stator core assembly (2), stator windings (3) and, arranged at one end of the stator core assembly (2), an interconnecting arrangement (4) for the stator windings (3); and
   the interconnecting arrangement (4) has an insulating part (9) composed of several individual annular parts (9a, 9b, 9c) each having a slotted chamber (11) in order to accept respective electric connecting leads (12) that are insulated with respect to each other in order to interconnect wire ends (7) of the stator windings (3).

2. A stator for an electric motor, comprising:
   a stator core assembly (2), stator windings (3), and an interconnecting arrangement (4) for the stator windings (3), said interconnecting arrangement (4) being arranged at one face end of the stator core assembly (2);
   said interconnecting arrangement (4) comprising a circular insulating part (9) arranged coaxially with respect to a motor axis and having slotted chambers (11) in the form of coaxial ring slots for incorporation of electric connecting leads (12);
   said connecting leads (12) being insulated with respect to each other and serving to interconnect wire ends (7) of the stator windings (3);
   said connecting leads (12) further being in the form of conductors each of circular shape or in the shape of a circular arc and having terminal extensions (13) at different locations; and
   said terminal extensions (13) projecting out of the chambers (11) for connection with the wire ends (7) of the windings (3).

3. The stator according to claim 2,
   wherein said coaxial ring chambers (11) have mutually different diameters and are open in an axial direction facing away from the stator core assembly (2).

4. The stator according to claim 3,
   wherein the terminal extensions (13) project from the chambers (11) in an axial direction in order to connect the wire ends (7) and also motor terminal leads (8).

5. The stator according to claim 2,
   wherein said ring chambers are arranged side by side in an axial direction with the same diameter and being open in the radially outward direction.

6. The stator according to claim 5,
   wherein the terminal extensions project from the chambers in a radial direction in order to connect wire ends (7) and also motor terminal leads (8).

7. The stator of claim 2, characterized in that the connecting leads (12) are composed of copper or brass.

8. The stator of claim 2, characterized in that the connecting leads (12) are in the form of sheet metal strips, which are either stamped out or cut out.

9. The stator of claim 2, characterized in that the connecting leads (12) are of rectangular cross section.

10. The stator of claim 2, characterized in that each of the connecting leads (12) is formed as individual sections of a conductor, which are insulated from each other within the chamber (11).

11. The stator of claim 2, characterized in that the insulating part (9) has at least one holding extension (14) for a friction- or form-fit connection with the stator core assembly (2).

12. The stator of claim 2, characterized in that the insulating part (9) has three holding extensions (14) arranged about the circumference in a uniform distribution.

13. The stator of claim 2, characterized in that the insulating part (9) is designed as a single piece pressed or molded plastic part.

14. The ststor of claim 1, characterized in that annular individual parts (9a–c) of an insulating part (9) that feature differant diameters are connected to each other by means of connecting elements (16) in a concentric manner in such a way that leadthroughs (17) for the wire ends (7) of the windings are formed between the adjacent individual parts (9a,b; 9b,c).

15. The stator of claim 14, characterized in that connecting elements (16) are in the form of connecting profiles that can be slid one into the other in an axial direction.

16. The stator of claim 2, characterized in that the terminal extensions (13) of the connecting leads (12) have hooks (13a) that allow for a pressure welding while accepting the wire ends (7) of the windings.

17. The stator of claim 1, characterized in that hooks (13a) are located, in each case, such that said hooks are displaced in an axial direction in the regions of leadthroughs (17) formed between the individual parts (9a,b,c) of the insulating part (9) or in a cross sectional region enclosed by an innermost individual part (9c).

18. The stator of claim 1, characterized in that the insulating part (9) can be fastened to a stator (1) or to an insulating part (18) by means of a pin connection with an insulating part (18) having several axial pins (19) that engage with openings (20) of the insulating part (9).

19. The stator of claim 2, characterized in that a printed-circuit board (21) is fastened to the side of the insulating part (9) facing away from the stator windings (3) in an axial direction, by means of a pin connection of at least two axial pins (22) of the insulating part (9) that engage with openings of the printed-circuit board (21).

20. The stator of claim 19, characterized in that the printed-circuit board (21) carries at least rotor rotational position sensors (23) that project in the axial direction between individual insulating parts (9a,9b) of which the insulating part (9) is composed, into the region of a rotor.

* * * * *

UNITED STATES PATENT AND TRADEMARK OFFICE
CERTIFICATE OF CORRECTION

PATENT NO. : 5,828,147

DATED : October 27, 1998

INVENTOR(S) : DIETER BEST, ET AL.

It is certified that error appears in the above-identified patent and that said Letters Patent is hereby corrected as shown below:

Col. 6, line 56, "ststor" should be --stator--;

Col. 6, line 58, "differant" should be --different--.

Signed and Sealed this

Ninth Day of March, 1999

*Attest:*

*Attesting Officer*

Q. TODD DICKINSON

Acting Commissioner of Patents and Trademarks